April 6, 1965 M. T. DURLOFSKY 3,177,493

APPARATUS FOR PROVIDING FLUID BEARINGS

Filed Dec. 6, 1960 2 Sheets-Sheet 1

INVENTOR.
Meyer T. Durlofsky
BY
Morris Rabkin
Attorney

April 6, 1965 M. T. DURLOFSKY 3,177,493

APPARATUS FOR PROVIDING FLUID BEARINGS

Filed Dec. 6, 1960 2 Sheets-Sheet 2

INVENTOR.
Meyer T. Durlofsky
BY
Morris A. Rabkin
Attorney 3,177,493

APPARATUS FOR PROVIDING FLUID BEARINGS

Meyer T. Durlofsky, Philadelphia, Pa., assignor to Radio Corporation of America, a corporation of Delaware Filed Dec. 6, 1960, Ser. No. 74,053
8 Claims. (Cl. 346—74)

Figure 1:
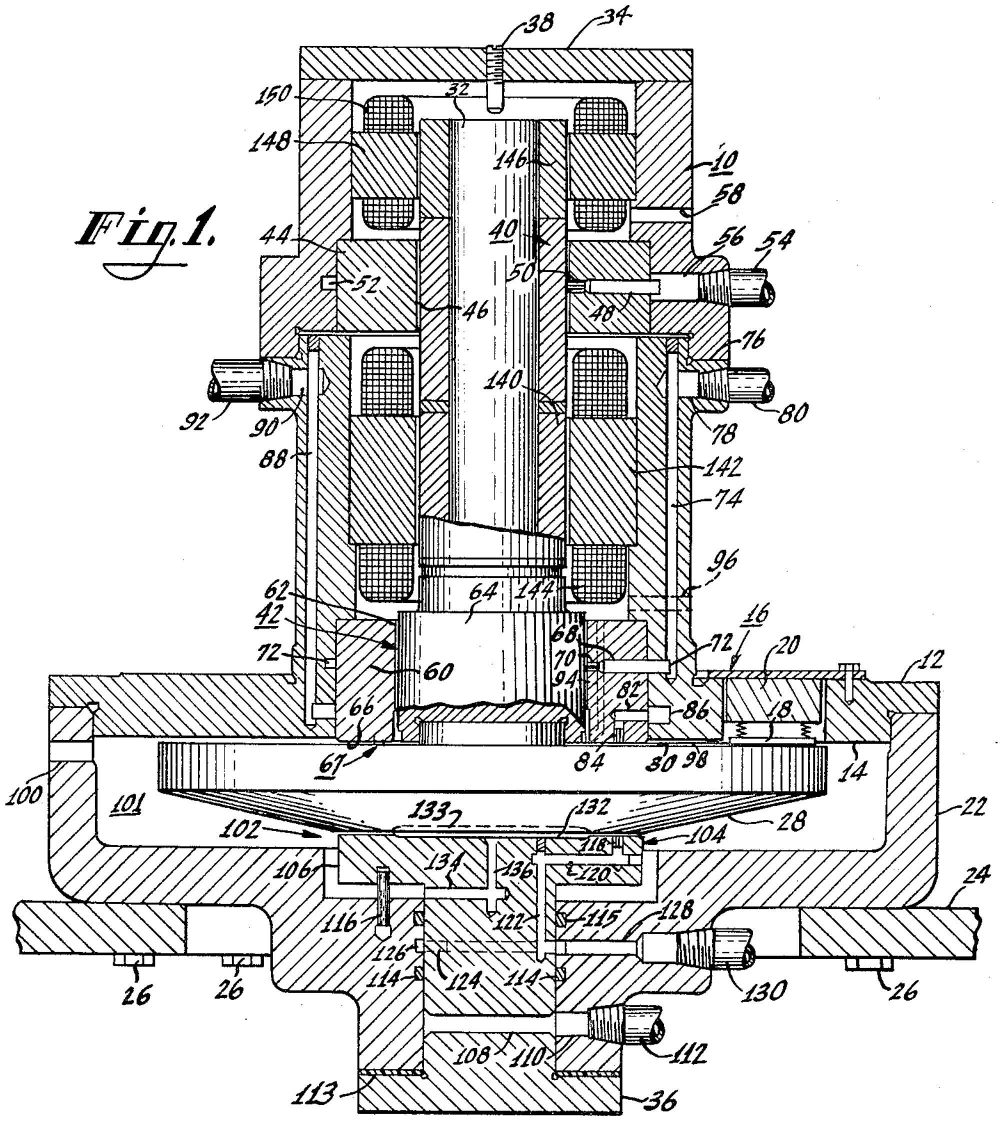

The present invention relates to apparatus for providing fluid bearings, and more particularly to an assembly for providing bearings which are lubricated by a pressurized fluid lubricant, such as air, for supporting a magnetizable record medium.

The invention is especially suitable for use in magnetic recording and reproducing apparatus of the type wherein a magnetic transducer, hereinafter referred to as a magnetic head, is spaced from a magnetic record medium by a hydrodynamic fluid bearing. The invention will also be found applicable in apparatus for supporting rotatable members by radial bearings and axial thrust bearings of externally pressurized fluids, wherein the fluid is preferably air.

In magnetic recording apparatus wherein a magnetic head is hydrodynamically floated on a moving record medium, the separation between the head and the medium is usually a matter of micro-inches. Any misalignment between the head and the record medium introduces errors in the recording or reproducing process. Moreover, slight deviations in head or record position (such, for example, as tilting of the head with respect to the record) may prevent the formation of the hydrodynamic bearing. The head may then strike the medium, causing damage to either the head or the medium.

Hydrodynamic air bearings suitable for carrying loads are formed only when the medium is moving with respect to the head at considerable speed (for example, several thousand inches per second). The head is normally spring mounted so that the head would strike the recording surface of the record in the absence of the hydrodynamic bearing. It is, therefore, necessary to provide the requisite relative motion between the head and the record before the head and record are brought into operating position.

Ordinarily, the record is a drum or disc and the head is mounted on a support. The drum or disc is brought up to predetermined speed sufficient to form a hydrodynamic bearing. The record medium or the head or both are then moved with respect to each other until they are disposed in proper operating position. Movement of the head or the record medium into proper operating position is a delicate operation because of the necessity for accurate alignment and the close tolerances involved. Apparatus for automatically bringing the head and record medium into operating position has not been entirely satisfactory, since the tolerances required in the construction of such automatic apparatus are commensurate with the accuracy needed in alignment and such tolerances are difficult to achieve in known apparatus. Also, in the known apparatus, friction and wear will eventually affect the accuracy of head to record medium alignment.

It is an object of the present invention to provide improved apparatus for providing fluid bearings whereby a rotatable member, such as a magnetic record medium, can be accurately, safely and consistently moved into precise operating position with respect to a hydrodynamically floated device, such as a magnetic head.

It is a further object of the present invention to provide an assembly for providing pressurized fluid bearings to accurately support and position a rotatable member even when the rotatable member is running at high speed.

It is a still further object of the present invention to provide improved apparatus for accurately supporting magnetic recording and reproducing apparatus.

It is a still further object of the present invention to provide an assembly for establishing pressurized fluid bearings which support and accurately position a magnetic record member which is moving at high speed.

It is a still further object of the present invention to provide an improved assembly for providing radial bearings and thrust bearings which are lubricated by a pressurized fluid, which assembly is capable of rigidly supporting a member which is rotating at high speed.

Briefly described, the invention includes a pair of pressurized fluid bearings which are spaced from each other and between which a rotatable member, such as a magnetic disc record, is disposed. The apparatus of the invention includes means for moving the first of the pair of bearings toward and away from the second of the pair of bearings. An operating device, such as a magnetic head which is adapted to be hydrodynamically floated, may be disposed in alignment with the second one of these bearings. The rotatable member is brought up to predetermined speed required for the formation of a hydrodynamic bearing while supported on the first of the bearings. After the rotatable member is rotating at predetermined speed, the first bearing is moved toward the second bearing to bring the rotatable member into operating position where the operating device will be hydrodynamically floated. In this position, the rotatable member is accurately positioned by the low friction, effective reference surface provided by the second bearing. The rotatable member is also rigidly supported between the first and second bearings.

Thus, the invention provides a pressurized fluid bearing configuration of inherent low friction which is capable of accurately and securely positioning a high speed rotatable member so as to permit the hydrodynamic bearing-operating device to perform upon it with great precision.

Figure 2:
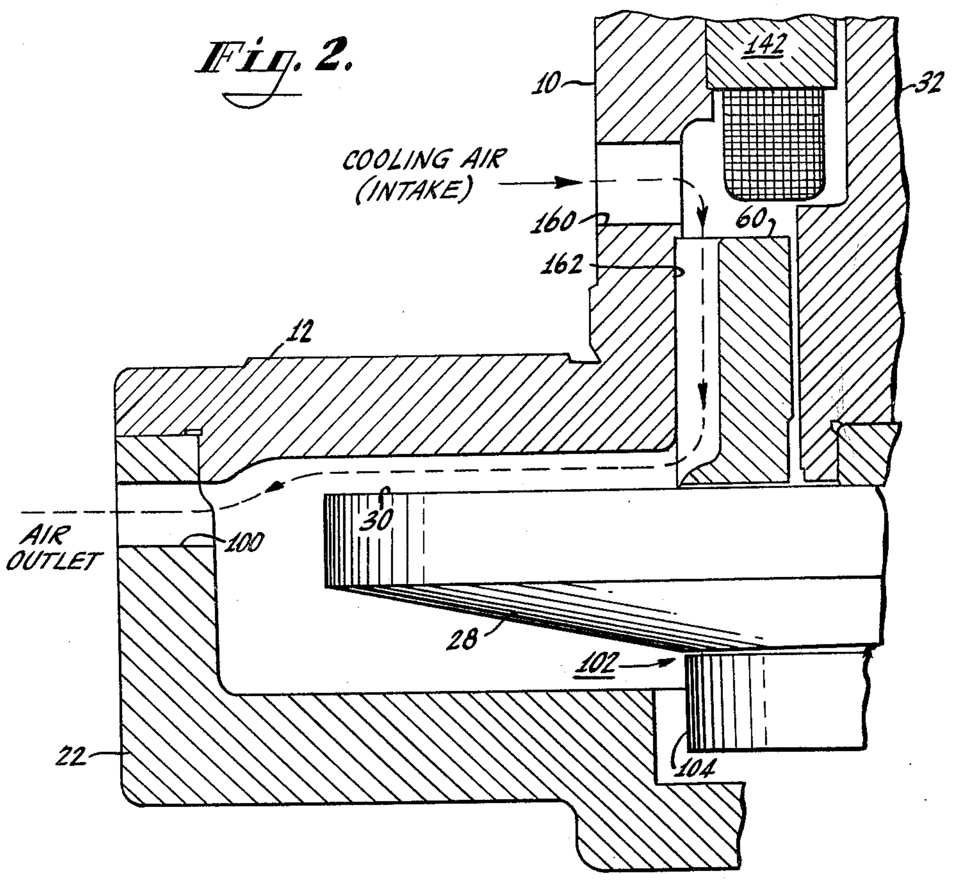

The invention itself, both as to its organization and method of operation, as well as the foregoing and other objects and advantages thereof, will become more readily apparent from a reading of the following description in connection with the accompanying drawings, in which:

FIGURE 1 is a sectional plan view of a magnetic recording and reproducing apparatus according to the present invention; and FIGURE 2 is a fragmentary sectional view of another embodiment of magnetic recording and reproducing apparatus according to the invention.

Referring to FIG. 1 of the drawings, there is shown an annular, multiple-part housing 10 described hereinafter in greater detail and having a generally cylindrical internal surface and a flange 12 extending radially outwardly from the lower portion thereof. The flange 12 has a radial lower surface 14. The flange 12 also has an opening therein in which a typical magnetic head 16 is mounted. The head 16 is of the type which is adapted to hydrodynamic air floating and includes a pad 18 which is spring mounted on a support 20.

The housing 10 fits on top of a cup-shaped base 22. The base 2 is disposed on a mounting plate 24 and is secured to the mounting plate by means of screws 26. A disc 28 is disposed within the confines of the base 22. The disc 28 has a magnetizable recording surface 30 with which the head 16 is adapted to cooperate. Although only one head 16 is shown in FIG. 1, a plurality of heads may be mounted around the flange 14 at the same or different radial distances from the axis of the disc 28.

The disc 28 is fitted to the bottom of a shaft 32, as by a friction fit or screws. The shaft is confined within the housing 10. The top of the housing 10 is closed by a plate 34 and the base 22 is closed by a plug 36. Accordingly, the disc 28 and shaft 32 are sealed within the base and housing. A bolt 38 is threaded in the plate 34. This bolt may be screwed down against the shaft 32 to prevent vibration of the shaft 32 and the disc 28 during shipment of the apparatus.

The shaft is supported by a pair of radial, pressurized upper and lower fluid bearings 40 and 42. The upper bearing 40 includes an annular body 44 which is secured in the upper part of the housing 10, as by force fitting. This body has a generally cylindrical internal surface 46 which is spaced from the cylindrical outer surface of the shaft 32. A plurality of air supply passages 48 (six or eight, for example) are radially disposed in the body 44. These passages are terminated by orifices 50. An annular groove 52 is formed around the inner surface of the housing 10 and communicates with the passages 48. Air under pressure from a source (not shown) is supplied through piping 54 and through a radial passage 56 which communicates with the groove 52. This air is the fluid which lubricates the bearing 40. The air passes through the bearing 40 and out of the housing through vent 58 and another vent 96 in the housing 10.

The bearing 42 is provided by an annular body 60 which has a generally cylindrical internal surface 62 which cooperates with a circular outer surface comprising an outwardly stepped portion 64 of the shaft 32. The body 60 also has a radial, lower surface 66 which is adapted to cooperate with the upper surface of the disc 28 to provide an accurate, low friction thrust air bearing 67 which serves to align the disc 28 and the head 16 in operating position, as will be explained more fully hereinafter. It will be observed that the radial surface 66 is in the same plane as the bottom of the pad 18 of the head 16 and thus serves as a reference surface which is in alignment with the head. This arrangement also circumvents problems, due to thermal expansion of the shaft 32.

The body 60 has a plurality of air supply passages 68 (six or eight, for example) which are radially disposed therein. These passages are terminated by orifices 70 through which air under pressure enters the space between the external surface of the stepped portion 64 of the shaft 32 and the internal surface 62 of the body 60. Air is supplied to the passages 68 by way of an annular groove 72 in the internal surface of the housing 10. This groove 72 communicates with the passages 68. This groove 72 also communicates with a riser passage 74 in the housing. This riser passage 74 may be bored or drilled in the housing, since the housing is initially made of two parts joined at a split 76. The riser passage 74 is plugged after it is drilled. Air is supplied to the riser passage 74 through a radial passage 78 in the housing 10 which intersects the riser passage 74. A pipe 80, which may be connected to a source of air under pressure (not shown), is coupled into the passage 78.

The radial, thrust bearing surface 66 is supplied with air by way of a plurality (six or eight, for example) of radial passages 82 in the body 60. A plurality of passages terminating in orifices 84 are drilled upwardly into radial passages 82. An annular groove 86 in the housing 10 communicates with the passages 82. This groove 86 is intersected by a riser passage 88 in the huosing 10. This riser passage 88 may be drilled and plugged in a manner similar to that of the riser passage 74. A radial passage 90 communicates with the riser passage 88. Air from a source of pressurized air (not shown) is supplied by way of a pipe 92 which is threaded in the passage 90.

The air which emanates from the orifices 84 is vented through a passage 94 in the body 60 into the space within the housing 10 immediately above the body 60. From this space, the air is vented to the ambient through a passage 96 in the housing 10. The shaft 32 and the body 60 are both slightly recessed in the vicinity of the passage 94, as can be seen in FIG. 1 just above the bearing surface 66. This creates a region of lower pressure than exists between the radial surface 66 and the recording surface 30. The air therefore flows into this region and finds an outlet, through the passages 94 and 96, into the ambient. Some of the air which emanates from the orifice 84 is also vented through a recessed region 98 in the radial surface 66 and into the space 101 within the base 22 in which the disc 28 is located. The air is vented from this space 101 into the ambient through a passage 100 in the wall of the base 22.

The disc 28 is supported by a lower thrust bearing 102. This lower thrust bearing is provided by an assembly including a piston 104 having an enlarged upper or head portion. The piston 104 is movably mounted in the lower portion of the base 22. The lower portion of the base 22 forms an expanding chamber 108. The chamber 108 communicates with a radial passage 110 in the base. A pipe 112 is coupled to the passage 110. Air from a source of pressurized air (not shown) is supplied through the pipe 112 to the chamber 108 to force the piston 104 upwardly. The amount of upward movement of the piston 104 is relatively small as compared to the overall size of the apparatus in the recording device illustrated in FIG. 1. However, the stroke can be made much larger, should a particular device require it. The chamber 108 is made air tight by the seal 114 about the piston 104 and a gasket 113 between the plug 36 and the end of the base 22. A pin 116 is mounted in the base 22 and extends to an opening in the upper portion of the piston 104. This pin 116 prevents rotation of the piston 104, but permits travel thereof in an axial direction.

The lower thrust bearing 102 is formed between the upper surface of the piston 104 and the lower end face of the disc 28. Pressurized air which forms this bearing is transmitted through a plurality of orifices 118 which terminate at the upper surface of the piston 104. Six or eight of these orifices may be provided. The orifices communicate with a plurality of radial passages 120 which are sealed at their outer ends. These radial passages each intersect with a different one of a plurality of riser passages 122 which are sealed at their upper ends. An annular groove 124, which communicates with the riser passages 122, is formed in the lower portion of the piston 104. This annular groove 124 also communicates with a wider, annular groove 126 in the internal surface of the base 22 to assure the air supply to lower thrust bearing 102 regardless of piston position. An air passage 128 in the base 22 is coupled to a pipe 130. This pipe is connected to a source of pressurized air (not shown) which provides the lower thrust bearing. Air supplied by the pipe 130 is confined by seals 114 and 115.

Air from the lower thrust bearing is vented through a space which is provided by a recess 132 in the central portion of the top surface of the piston 104, and a cooperating recess 133 in the central portion of the lower end face of the disc 28. This enlarged space provides a region of decreased pressure in the thrust bearing 102 into which the air from the orifices 118 flows. The recesses 132 and 133 communicate with the space 101 within the confines of the base 22 through an intersecting radial passage 134 and axial passage 136 in the piston 104. The air in the space 101 flows through the vent 100 to the ambient.

The shaft 32 includes a rotor 140 of relatively hard magnetic material. A stator structure 142 including coil windings 144 is secured in the housing 10 around this rotor 140 on the shaft 32. The stator structure 142 and the rotor 140 provide a synchronous induction motor for the purpose of rotating the shaft 32 and the disc 28.

Another rotor 146 is disposed around the upper portion of the shaft. This rotor is of hard magnetic material and of conductive material and cooperates with a stator structure 148 which includes coil windings 150. The stator structure 148 and rotor 146 provide a hysteresis eddy current brake for the purpose of permitting servo speed control of the rotating assembly. Major braking effort (required for halting the disc) is obtained by switching D.C. current across one of the motor windings 144.

The hysteresis brake, the motor, the power supplies and the source of air which supplies pressurized air to the chamber 108 may be connected in a control circuit for the purpose of insuring that the air which expands the lowermost chamber 108 must be turned off when the brake is on or when the current in the motor windings 144 indicates that the shaft is not up to a certain speed, say, for example 10,000 r.p.m.

In starting operation, the source of pressurized air which is connected to pipes 54, 80, and 130 is turned on so that the two radial bearings 40 and 42 and the lower thrust bearing 102 are pressurized. For improved air economy, air may not be introduced to the upper thrust bearing 67 until required. The air to the pipe 112, which is coupled to the lowermost chamber 108, is not turned on. The piston 104 therefore remains in its lowermost position under the influence of gravity. The shaft 32 and the disc 28, also under the influence of gravity, are in their normal, lower positions. In this position, the lower end face of the disc 28 is supported by the lower thrust bearing 102. The radial position of the disc is fixed by the radial bearings 40 and 42 which are spaced from each other axially along the shaft 32. The upper thrust bearing 67 having the reference surface 66 is not effective and is not yet receiving air since the recording surface 30 is normally spaced from the radial surface 66. The motor windings 142 are energized with alternating current of proper frequency. The motor rotates the shaft and the disc is soon brought to speed. This speed is a predetermined speed, such as 15,000 r.p.m., at which a hydrodynamic bearing will be formed between the pad 18 of the head 16 and the recording surface 30 of the disc 28, when the disc and the head are in proximity in their operating positions. When sufficient time has elapsed, and when, from other indications, as the pitch of the sound generated by the rotating assembly it appears that the disc is rotating at the predetermined speed, air is introduced to the thrust bearing 67 through the pipe 92 and into the chamber 108 through the pipe 112. The air forced into the pipe 112 forces the piston 104 upwardly. There is some compliance in the lower thrust bearing because of the piston seals so that the lower thrust bearing pushes uniformly and squarely against the lower surface of the disc even if there is some deviation from parallelism between the piston bore and the axis of the shaft. The disc 28 is accurately guided by the radial bearings 42 and 40. Accordingly, the disc does not tilt or cock in any way.

The disc advances to a position fixed by the radial reference surface 66 of the upper thrust bearing 67, now operative by the air forced into pipe 92. Since the position defined by the upper thrust bearing is in accurate alignment with the desired operating positions of the head and the disc, the head and the disc are accurately located in their operating positions. In operating position a hydrodynamic bearing is formed between the pad 18 and the disc surface 30. This bearing separates the pad and disc by a very small distance to permit proper signal transducing operation. The disc is rigidly supported, both axially and radially, by the upper and lower thrust bearings and by the radial bearings 40 and 42. The provision of a pair of opposed thrust bearings insures that the disc 28 will be rigidly supported and will be stable in spite of any severe vibration and shock. The disc 28 is shown in operating position in FIG. 1. The lowermost position of the disc 28 is slightly below the position shown in the drawings.

Referring to FIG. 2 of the drawings, portions of the assembly which are similar to the portions illustrated in FIG. 1 are identified with like reference numerals. The housing 10 is modified by providing a cooling air intake opening 160 and by providing, in the body 60, grooves 162. The air passages 72, 88, 74 and 70 (FIG. 1) are placed so as to allow room for the opening 160 and groove 162. A filter (not shown) may be disposed outside of the opening 160 to filter the air which enters into the housing through the opening 160. If the temperature of the ambient air is high, due to the climate or other operating conditions, the air may be cooled by a refrigerating mechanism, such, for example, as a thermoelectric device, prior to being supplied to the opening 160.

In operation, the air will be forced into the opening 160 and through the grooves 162 by the pumping action of the rapidly moving recording surface 30 of the disc 28. It is well known that a rapidly rotating member forces air or other fluid in contact therewith radially outwardly when it rotates. This effect is quite pronounced at high speeds, and is referred to, in the art, as the natural pumping action of high speed surfaces. The air is therefore pumped by the moving disc 28 into the channel between the disc and the flange 12. The air vents through the outlet hole 100 and serves to cool the head 16 and any other heads which may be disposed in the flange 12.

From the foregoing description, it will be apparent that there has been provided an improved apparatus for providing fluid bearings. The apparatus is especially suitable for use in magnetic recording and reproducing equipment of the type using a rotatable record medium, such as a magnetic disc. The apparatus provides rigid and accurate support for the disc in a plurality of operating positions thereof. While two embodiments of the invention have been described, other embodiments thereof, as well as variations in the described apparatus within the scope of the invention, will undoubtedly be apparent to those skilled in the art. Accordingly, the foregoing description should be taken as illustrative and not in any limiting sense.

What is claimed is:

1. Apparatus for supporting a high speed rotatable member which comprises means for providing a bearing surface disposed on one side of said member, means for establishing an externally pressurized fluid bearing on said bearing surface for supporting said member on said one side thereof, means for providing another bearing surface spaced from said first named bearing surface and opposed to an opposite side of said member, means for establishing an externally pressurized fluid bearing on said other bearing surface, said member opposite side having a non-operating relation with said other bearing surface in a first position and means operative upon said first-named bearing surface providing means for shifting said first-named bearing surface and advancing said opposite side of said member from said first position into operating relationship with said other bearing surface.

2. Apparatus for supporting a high speed rotatable member which comprises a housing, a first bearing in said housing member having a bearing surface disposed on one side of said rotatable member, means for passing a fluid under pressure through said first bearing member surface for providing thrust support for said rotatable member on said one side thereof, a second bearing member in said housing having a bearing surface opposed to an opposite side of said rotatable member and spaced therefrom, means for passing a fluid under pressure through said second bearing surface, said member opposite side having a thrust supporting relation in a first position and means for shifting said first bearing member from said first position toward said second bearing member and thereby advancing said opposite side of said rotatable member into thrust support relationship with said second bearing member surface.

3. Apparatus as set forth in claim 2 including at least one annular bearing member in said housing, said annular bearing member having an internal bearing surface disposed around said rotatable member, and means for passing a fluid under pressure through said annular bearing surface for providing a radical fluid bearing for guiding said rotatable member.

4. Apparatus for supporting a rotatable member having a generally cylindrical external surface and a pair of radial surfaces adjoining said cylindrical surface which comprises a body having a generally cylindrical internal bearing surface for containing said cylindrical external surface of said member, said body also having a generally radial internal bearing surface opposing one of said pair of radial surfaces of said rotatable member, an element movably mounted within said body and having a radial bearing surface spaced from said radial bearing surface of said body and opposed to the other of said pair of radial surfaces of said rotatable member, means for applying pressurized fluid between said member surfaces and their cooperating said bearing surfaces, and means for moving said element axially of said rotatable member for advancing said one radial bearing surface of said member toward said radial bearing surface of said body for sliding thrust engagement therewith.

5. Apparatus for supporting a disc which comprises a shaft secured to said disc, a body having an internal cylindrical surface confining said shaft and defining a radial bearing for radially supporting said shaft, said disc having a first end face adjoining said shaft and extending radially therefrom, said body having an internal radial bearing surface opposed to said first end face, said disc also having a second end face opposite to said first end face, a base having enclosing walls, an element movable in said base and defining an expanding chamber within said walls of said base, said element having a radial bearing surface opposed to said second end face of said disc, means for applying pressurized fluid between said internal cylindrical surface and said shaft and between said first and second end faces of said disc and said radial bearing surfaces cooperating therewith, means for rotating said shaft, and means for expanding said chamber after said shaft and said disc have reached a predetermined speed of rotation to move said element and said disc toward said radial bearing surface of said body so as to accurately support said disc between said radial bearing surfaces.

6. In magnetic recording apparatus provided with a disc having a recording surface which is of magnetizable material, and a transducer adapted to be hydrodynamically floated on said recording surface of said disc when said disc rotates at predetermined speed, apparatus for supporting said disc and said transducer which comprises a first pressurized fluid thrust bearing radially aligned with said transducer, an assembly providing a second pressurized fluid thrust bearing normally supporting the end face of said disc opposite from said recording surface thereof, said disc and said second bearing being movable toward and away from said transducer and said first bearing means for rotating said disc to said predetermined speed, and means for moving said second thrust bearing after said disc is rotating at said predetermined speed to advance said disc against said first thrust bearing.

7. Apparatus for supporting a magnetic disc record for cooperation with a magnetic transducer so as to form a hydrodynamic bearing between said disc and said transducer, said apparatus comprising a shaft secured to said disc, an assembly providing a radial, pressurized fluid bearing around said shaft, means for providing a pressurized thrust bearing in alignment with said transducer, and an assembly for providing a movable pressurized thrust bearing which is disposed to support an end face of said disc, means for rotating said disc to a predetermined speed when said disc is supported on said movable thrust bearing and is disposed away from said transducer, and means to advance said disc into cooperating relationship with said first named thrust bearing whereby to support said disc in alignment with said transducer while said transducer is hydrodynamically floating.

8. Apparatus for supporting a high speed, rotatable record element having a cylindrical portion and a disc portion extending radially from said cylindrical portion, said disc portion having a radial surface, said apparatus comprising a housing enclosing said element and having a radial, internal wall spaced from said radial disc portion surface to define an annular gap therebetween, a transducer disposed in said housing facing said element, a cylindrical bearing member on an inner wall of said housing having an internal, cylindrical bearing surface adapted to cooperate with the outer surface of said cylindrical member and a radial surface adapted to cooperate with said radial disc portion surface, means for applying pressurized fluid between said cylindrical bearing surface and said cylindrical member outer surface and also between said bearing member radial surface and said radial disc portion surface, said bearing member having a passage therein communicating at one end thereof with said annular gap, said housing having a passage therein communicating with said bearing member opening at the opposite end thereof, and said housing having another passage communicating with said gap whereby a passageway for fluid pumped when said disc portion rotates at high speed is provided for cooling said disc portion through said housing and across said radial disc portion surface.

References Cited by the Examiner

UNITED STATES PATENTS

| | | | |
|---|---|---|---|
| 1,810,083 | 6/31 | Norinder | 230—118 |
| 1,975,568 | 10/34 | Dubrovin | 230—118 |
| 2,603,539 | 7/52 | Brewster | 179—100.2 |
| 2,862,781 | 12/58 | Baumeister | 346—74 |
| 2,915,358 | 1/59 | Richards | 346—74 |
| 3,005,675 | 10/61 | Ledin et al. | 340—174.1 |
| 3,029,416 | 4/62 | Quade | 340—174.1 |
| 3,030,452 | 4/62 | Uritis | 340—174.1 |
| 3,063,039 | 11/62 | Taft | 340—174.1 |

IRVING L. SRAGOW, *Primary Examiner.*

NEWTON N. LOVEWELL, *Examiner.*